United States Patent
Gao et al.

(10) Patent No.: US 8,295,625 B2
(45) Date of Patent: Oct. 23, 2012

(54) METHOD AND DEVICE FOR ENCODING AND DECODING COLOR ENHANCEMENT LAYER FOR VIDEO

(75) Inventors: Yong Ying Gao, Beijing (CN); Yu Wen Wu, Beijing (CN); Ying Chen, San Diego, CA (US)

(73) Assignee: Thomson Licensing, Boulogne-Billancourt (FR)

( * ) Notice: Subject to any disclaimer, the term of this patent is extended or adjusted under 35 U.S.C. 154(b) by 270 days.

(21) Appl. No.: 12/311,375

(22) PCT Filed: Sep. 30, 2006

(86) PCT No.: PCT/CN2006/002593
§ 371 (c)(1),
(2), (4) Date: Jul. 1, 2010

(87) PCT Pub. No.: WO2008/043198
PCT Pub. Date: Apr. 17, 2008

(65) Prior Publication Data
US 2010/0272185 A1      Oct. 28, 2010

(51) Int. Cl.
*G06K 9/46* (2006.01)
(52) U.S. Cl. ........ 382/239; 382/233; 382/236; 382/238; 382/250; 382/251; 375/240.01; 375/240.16; 375/240.12
(58) Field of Classification Search .......... 382/232, 382/233, 236, 238, 239, 248, 250, 251; 348/409.1, 348/412.1, 413.1, 415.1, 416.1, 394.1; 375/240.01, 375/240.06, 240.12, 240.16
See application file for complete search history.

(56) References Cited

U.S. PATENT DOCUMENTS

| | | | |
|---|---|---|---|
| 6,466,698 B1 | 10/2002 | Creusere | |
| 7,203,235 B2* | 4/2007 | Huang et al. | 375/240.11 |
| 7,245,659 B2* | 7/2007 | Sekiguchi et al. | 375/240.12 |
| 7,639,739 B2* | 12/2009 | Rose et al. | 375/240.01 |
| 7,876,833 B2* | 1/2011 | Segall et al. | 375/240.24 |
| 8,014,445 B2 | 9/2011 | Segall et al. | |
| 8,023,753 B2* | 9/2011 | Abe et al. | 382/233 |
| 2005/0259729 A1 | 11/2005 | Sun | |

FOREIGN PATENT DOCUMENTS

| | | |
|---|---|---|
| EP | 1507415 | 2/2005 |
| JP | 2007243942 | 9/2007 |

OTHER PUBLICATIONS

Search Report Dated Jun. 20, 2007.

* cited by examiner

*Primary Examiner* — Ali Bayat
(74) *Attorney, Agent, or Firm* — Robert D. Shedd; Jeffrey M. Navon; Jerome G. Schaefer

(57) ABSTRACT

Enhanced dynamic range requires more than 8 bit representation for single color components of pixels. For this purpose, normal color resolution images and high color resolution images are available. Backward compatibility can be achieved by a layered approach using a color enhancement layer, and a conventional image as color base layer. Both have same spatial and temporal resolution. Encoding of the color enhancement layer uses prediction and residual. A methods for optimized color enhancement prediction is disclosed. Color bit depth prediction is done by constructing a polynomial that approximates for all pixels of one color component of a block the color enhancement layer from the color base layer. A predicted version of the high color resolution image and a residual are generated and updated by a residual. The coefficients are compressed and added as metadata to the data stream.

3 Claims, 2 Drawing Sheets

METHOD AND DEVICE FOR ENCODING AND DECODING COLOR ENHANCEMENT LAYER FOR VIDEO

This application claims the benefit, under 35 U.S.C. §365 of International Application PCT/CN2006/002593, filed Sep. 30, 2006, which was published in accordance with PCT Article 21(2) on Apr. 17, 2008 in English.

FIELD OF THE INVENTION

The present invention relates to the field of digital image processing and video compression. In particular, a solution for color bit depth prediction is provided, which is a crucial issue in color bit depth scalable coding.

BACKGROUND

The advantages of digital processing have motivated efforts on high-dynamic-range-enabled digital imaging systems in order to take the place of traditional film-based imaging technology. Most widely used video coding standards utilize three color components (red, green, blue) to specify the color information. Compared with conventional eight bit representation for a single color component of one pixel in an image, an enhanced dynamic range requires more than eight bits to represent one color component of one pixel. With the development of high bit-depth color techniques, the issue of backward compatibility to the existing eight bit depth has emerged. Solutions to this issue are highly desired, since new compression and storage techniques, transmitting methods, playback devices, and display devices for eight bit depth and high bit-depth are required.

Further, the capability of providing different color bit depths of a single video content within a single bit-stream is of particular importance to different terminal display capabilities during multimedia content deliveries. One solution for backward compatibility to eight bit depth is color bit depth scalability. A possible framework for color bit depth scalable video coding is shown in FIG. 1. Two input video sequences describe the same scene, but have different color bit depth: usually M=8 while N=10, 12, or 16. The M-bit input is encoded as the base-layer. At the terminal, a standard display device (Std Display) can use the decoded base-layer for displaying.

More visual information of the N-bit input is encoded in the enhancement-layer. If a terminal has a high quality display device (HQ Display), the decoded enhancement-layer together with the decoded base-layer provides the complete information to display the N-bit video sequence. In this case, inter-layer prediction as shown in FIG. 1 impacts significantly the coding efficiency.

SUMMARY OF THE INVENTION

The present invention provides a method and a device for performing color bit-depth prediction for this case, i.e. inter-layer prediction for color bit depth scalability.

According to one aspect of the invention, a spatially localized approach for color bit depth prediction by polynomial approximation is employed. Two video sequences are considered that describe the same scene and contain the same number of frames. Two frames that come from the two sequences respectively and have the same picture order count (POC), i.e. the same time stamp, are called a "synchronized frame pair" in herein. For each synchronized frame pair, the corresponding pixels (meaning two pixels that belong to the two frames respectively but have the same coordinates in the image coordinate system) refer to the same scene location or real-world location. The only difference between the corresponding pixels is the color bit depth, corresponding to color resolution. Following the notation in FIG. 1, one sequence has M bit color depth, while the other has N bit depth, with M<N. The task of color bit depth prediction is to generate a predicted version of the N-bit sequence from the M-bit sequence, following the criterion that the difference between the predicted N-bit sequence and the original N-bit sequence is minimized.

In one embodiment, PSNR is used as difference measurement. This has two advantages: first, PSNR is widely accepted and used in the field of video compression. Second, in this case it is considered more important how the predicted image works for following residual data compression than how the predicted image looks.

According to one aspect of the invention, a method for encoding a first color layer of a video image, wherein the first color layer comprises pixels of a given color and each of the pixels has a color value of a first depth, comprises the steps of
generating or receiving a second color layer of the video image, wherein the second color layer comprises pixels of said given color and each of the pixels has a color value of a second depth being less than the first depth,
dividing the first color layer into first blocks and the second color layer into second blocks, wherein the first blocks have the same number of pixels as the second blocks and the same position within their respective image, determining for a first block of the first color layer ($IN_i$) a corresponding second block of the second color layer, transforming the values of pixels of the second block into the values of pixels of a third block using a linear transform function that minimizes the difference between the first block and the predicted third block,
calculating the difference between the predicted third block and the first block, and
encoding the second block, the coefficients of the linear transform function and said difference.

In one embodiment, all pixels of a block use the same transform, and the transform is individual for each pair of a first block and its corresponding second block.

In one embodiment, a pixel at a position u,v in the first block is obtained from the corresponding pixel at the same position in the second block according to $$BN_{i,j}(u,v) = (BM_{i,j}(u,v))^n c_n + (BM_{i,j}(u,v))^{n-1} c_{n-1} + \square + (BM_{i,j}(u,v))^{1/m} c_{1/m} + c_0$$

with the coefficients being $c_n, c_{n-1}, \ldots, c_0$.

In one embodiment, the linear transform function is determined by the least square fit method.

In one embodiment, the method further comprises the steps of formatting the coefficients as metadata, and transmitting said metadata attached to the encoded second block and said difference.

According to one aspect of the invention, a method for decoding a first color layer of a video image ($IN_i$), wherein the first color layer comprises pixels of a given color and each of the pixels has a color value of a first depth (N), comprises the steps of
decoding a second color layer of the video image ($IM_i$), wherein the second color layer comprises pixels of said given color and each of the pixels has a color value of a second depth (M) being less than the first depth (N);
decoding coefficients ($Coef_i(l)$) of a linear transform function (LPA);
decoding a residual block or image ($IN^{RES}_{i,j}$);

applying the transform function (LPA) having said decoded coefficients ($Coef_i(l)$) to the decoded second color layer of the video image ($IM_i$), wherein a predicted first color layer of the video image ($IN'_i$) is obtained; and updating the predicted first color layer of the video image ($IN'_i$) with the residual block or image ($IN^{RES}_{i,l}$).

According to one aspect of the invention, a device for encoding a first color layer of a video image ($IN_i$), wherein the first color layer comprises pixels of a given color and each of the pixels has a color value of a first depth (N), comprises means for generating or receiving a second color layer of the video image ($IM_i$), wherein the second color layer comprises pixels of said given color and each of the pixels has a color value of a second depth (M) being less than the first depth (N);

means for dividing the first color layer into first blocks ($BN_{i,l}$) and the second color layer into second blocks ($BM_{i,l}$), wherein the first blocks have the same number of pixels as the second blocks and the same position within their respective image ($IM_i$, $IN_i$);

means for determining for a first block ($BN_{i,l}$) of the first color layer ($IN_i$) a corresponding second block ($BM_{i,l}$) of the second color layer ($IM_i$);

means for transforming the values of pixels of the second block ($BM_{i,l}$) into the values of pixels of a third block ($BN^P_{i,l}$) using a linear transform function (LPA) that minimizes the difference between the first block ($BN_{i,l}$) and the predicted third block ($BN^P_{i,l}$);

means for calculating the difference between the predicted third block ($BN^P_{i,l}$) and the first block ($BN_{i,l}$); and means for encoding the second block (BMi,l), the coefficients ($Coef_i(l)$) of the linear transform function (LPA) and said difference.

According to one aspect of the invention, a device for decoding a first color layer of a video image ($IN_i$), wherein the first color layer comprises pixels of a given color and each of the pixels has a color value of a first depth (N), comprises means for decoding a second color layer of the video image ($IM_i$), wherein the second color layer comprises pixels of said given color and each of the pixels has a color value of a second depth (M) being less than the first depth (N);

means for decoding coefficients ($Coef_i(l)$) of a linear transform function (LPA);

means for decoding a residual block or image ($IN^{RES}_{i,l}$);

means for applying the transform function (LPA) having said decoded coefficients ($Coef_i(l)$) to the decoded second color layer of the video image ($IM_i$), wherein a predicted first color layer of the video image ($IN'_i$) is obtained; and means for updating the predicted first color layer of the video image ($IN'_i$) with the residual block or image.

Advantageous embodiments of the invention are disclosed in the dependent claims, the following description and the figures.

BRIEF DESCRIPTION OF THE DRAWINGS

Exemplary embodiments of the invention are described with reference to the accompanying drawings, which show in FIG. 1 a framework for color bit-depth scalable video coding.

DETAILED DESCRIPTION OF THE INVENTION

In the following examples, without loss of generality, it is assumed that each frame consists of three color components C1, C2, and C3, which are specified in real implementations e.g. as red, green and blue. According to the invention, the processing described in the following is employed on each individual color component C1, C2, and C3, respectively.

The following notations will be used in the remaining part of this document:

K—the total frame number of the two input video sequences;
W—the image width of each frame;
H—the image height of each frame;
$IM_i(u,v)$—one color component (C1, C2 or C3) of the M-bit sequence with the subscript i representing the POC (i=1, 2, ? K), and (u,v) representing the pixel coordinates (u=0, 1, ? W−1, v=0, 1, ?H−1). It should be stressed that in real encoding/decoding processing, $IM_i(u,v)$ should be the reconstructed version of the M-bit sequence at the encoder. In the following, the term $IM_i(u,v)$ is used to represent the reconstructed version of the M-bit sequence; and $IN_i(u,v)$-one color component (C1, C2 or C3) of the N-bit sequence with the subscript i representing the POC (i=1, 2, ? K), and (u,v) representing the pixel coordinates (u=0, 1, ? W−1, v=0, 1, ?H−1).

Figure 1:
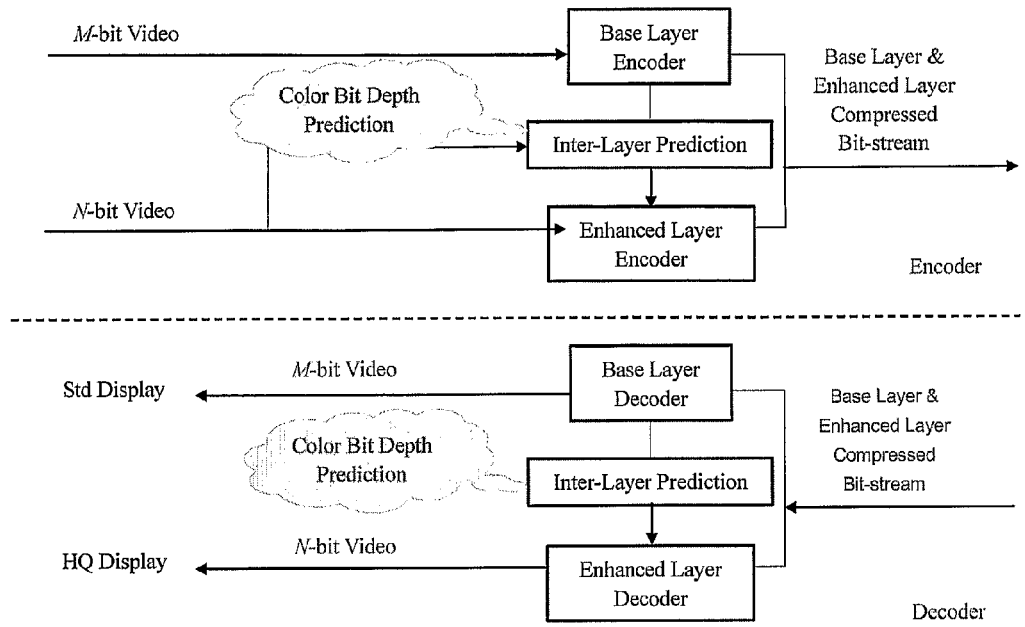
Figure 2:
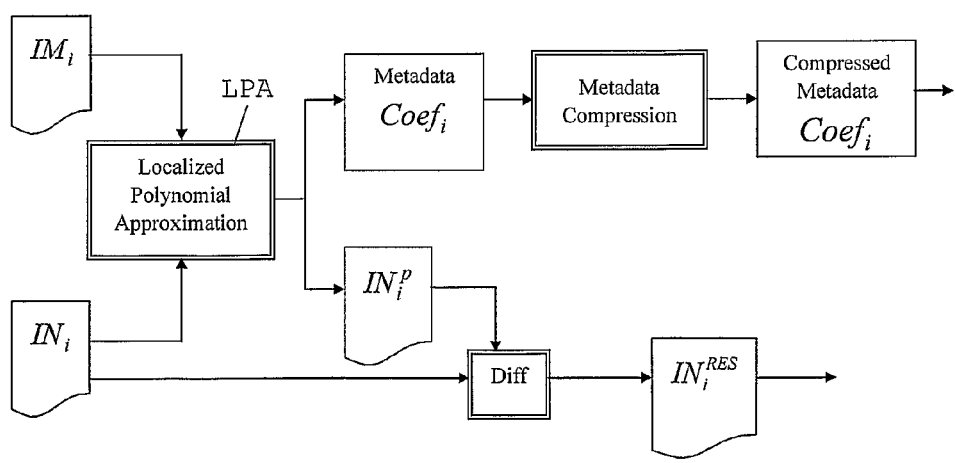
FIG. 2 a block diagram for localized color bit-depth prediction using polynomial approximation.

FIG. 2 shows an encoder for performing the spatially localized polynomial approximation for color bit depth prediction for each color component of a synchronized frame pair. An input synchronized frame pair $IM_i$, $IN_i$ is fed into a ڐocalized Polynomial Approximation? module, which is described in more detail below. It determines localized approximation polynomials, and outputs metadata $Coef_i$ consisting of the coefficients of the determined localized approximation polynomials. Further, it outputs a predicted version $IN^P_i$ of the N-bit input frame $IN_i$ which is used by the inter-layer prediction to generate a residual $IN^{RES}_i$ which defines the difference between the predicted and the actual high bit-depth image. The residual data are transmitted in the enhancement-layer data stream.

To reduce the data size of the metadata, the metadata $Coef_i$ are compressed, and the compressed metadata may be transmitted together with the multiplexed bit stream (base-layer bit stream and enhancement-layer bit stream) as side information.

At the decoder, the base-layer image $IM_i'$ is conventionally decoded, and the compressed metadata are decompressed to reconstruct the coefficients of the localized approximation polynomials. The predicted high bit-depth image $IN^P_i$ is then generated by applying the approximation polynomial on the decoded base-layer image $IM_i'$. The decoded high bit depth enhancement-layer image $IN_i$ is finally reconstructed by applying the inter-layer prediction to the predicted image $IN^P_i$ and updating the result with the decoded residual of the decoded enhancement-layer data.

In the following, the ڐocalized Polynomial Approximation? module and the ڒetadata Compression? module are described in detail.

In the ڐocalized Polynomial Approximation? module, the images of the synchronized frame pair are spatially divided into a number of blocks, wherein the block size can be fix or variable, and a polynomial approximation is done between each two corresponding blocks that are extracted from the two frames respectively and have the same block indexing number. The following notations will be used in the remaining part of this section:

bSize is the parameter for the block size. Each block may have bSize×bSize pixels. For real encoding/decoding processing, bSize may be a multiple of eight, which is convenient for macroblock level inter-layer prediction.

The image size may be a multiple of bSize×bSize, so that in other words both W and H are multiples of bSize. It is also possible to perform a pre-processing using padding to make W and H be multiples of bSize.

$BM_{i,l}$ is one block of the i-th frame $IM_i$, with l representing the block indexing number.

$BN_{i,l}$ is one block of the i-th frame $IN_i$, with l representing the block indexing number.

Figure 3:
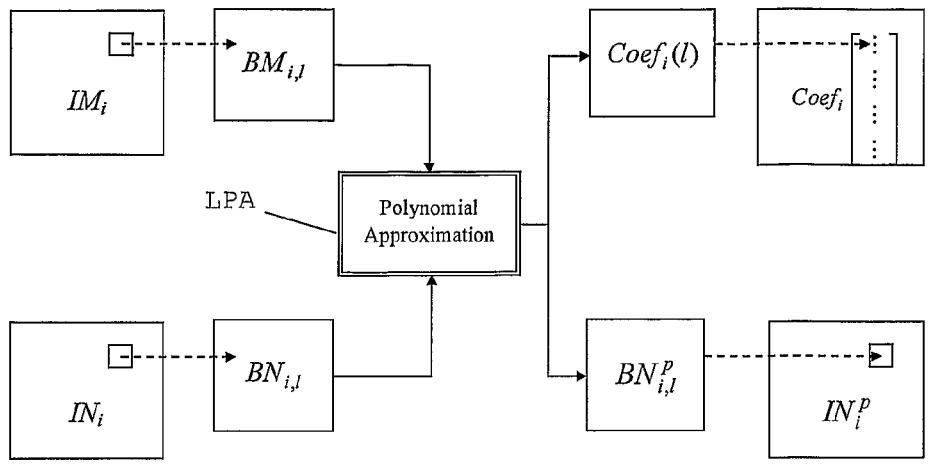
FIG. 3 a block diagram of block-level polynomial approximation.

FIG. 3 shows block-level polynomial approximation between the images of a synchronized frame pair, corresponding to FIG. 2. Two blocks $BM_{i,l}$, $BN_{i,l}$ from the same location within corresponding images $IM_i$, $IN_i$ with different color bit depth are fed into the polynomial approximation, and a set of output coefficients $Coef_i(l)$ is generated that are depicted as a vector in FIG. 3 and can be formatted as metadata, as mentioned above. The output metadata $Coef_i(l)$ contains the coefficients of the determined approximation polynomial for $BN_{i,l}$. The output $BN_{i,l}^p$ is the predicted version of $BN_{i,l}$, corresponding to the predicted image $IN_i^p$ shown in FIG. 2.

The order and the power of each term of the approximation polynomial are not determined in the present invention. In general, they should be specified according to the actual implementation. However, for arbitrary forms of the polynomial, including terms of fractional power, a general solution to obtain the polynomial coefficients $Coef_i(l)$ is provided by solving a system of linear equations, as described in the following.

Given a generic polynomial of the form $$y = c_n x^n + c_{n-1} x^{n-1} + \ldots + c_1 x + c_{1/2} x^{1/2} + \ldots + c_{1/m} x^{1/m} + c_0$$

then Eq. (1) is a linear equation that relates $BM_{i,l}$ to $BN_{i,l}$ $$[BM_{i,l}^n \ BM_{i,l}^{n-1} \ \ldots \ BM_{i,l} \ BM_{i,l}^{1/2} \ \ldots \ BM_{i,l}^{1/m} \ 1] \begin{bmatrix} c_n \\ c_{n-1} \\ \vdots \\ c_1 \\ c_{1/2} \\ \vdots \\ c_{1/m} \\ c_0 \end{bmatrix} = [BN_{i,l}] \quad \text{Eq. (1)}$$

Eq. (1) may be applied to every pixel of the blocks $BM_{i,l}$ and $BN_{i,l}$. In total there are bSize×bSize linear equations for each corresponding block pair $BM_{i,l}$ and $BN_{i,l}$. Each equation represents the relationship between a pixel in the high bit depth block and the corresponding pixel in the low bit depth block, so that the value of the pixel in the high bit depth block is equal to the polynomial function of the value of the corresponding pixel in the low bit depth block. For a pixel position (u,v), Eq. (1) can be understood as $$BN_{i,l}(u,v) = (BM_{i,l}(u,v))^n c_n + (BM_{i,l}(u,v))^{n-1} c_{n-1} + ? + (BM_{i,l}(u,v))^{1/m} c_{1/m} + c_0 \quad \text{Eq. (1a)}$$

The transform coefficients $c_n, c_{n-1}, \ldots, c_1, c_{1/2}, \ldots, c_{1/m}, c_0$ can be obtained by any standard method, e.g. a least square fit. To obtain a unique solution to the coefficients, the precondition bSize×bSize ≧ n+m should be satisfied. In practice however, this constraint is usually satisfied. In a decoder the predicted version $BN_{i,l}^p$ of the block is then obtained from the decoded base-layer pixels $BM_{i,l}$ according to $$BN_{i,l}^p = c_n BM_{i,l}^n + c_{n-1} BM_{i,l}^{n-1} + \ldots + c_1 BM_{i,l} + c_{1/2} BM_{i,l}^{1/2} + \ldots + c_{1/m} BM_{i,l}^{1/m} + c_0 \quad \text{Eq. (2)}$$

In practice, truncation or a logarithm-like transformation relating IN to IM is very likely to exist. Truncation means right bit-shift of the high bit depth version to generate the low bit depth version: assuming to have a 10-bit video sequence, truncating to an 8-bit video sequence means that each sample value of the 10-bit version is right bit-shifted, thus ignoring the least two bits. If such truncation or a logarithm-like transformation exists, the following form of the approximation polynomial is a good trade-off between approximation accuracy, complexity of computation and the overhead of the polynomial coefficients:

$$y = c_3 x^3 + c_2 x^2 + c_1 x + c_0 \quad \text{Eq. (3)}$$

For practical application, $BM_{i,l}$ and $BN_{i,l}$ may be normalized to values within the range [0,1] prior to the generation of Eq. (2). Advantages of the normalization are that first, from the viewpoint of numerical analysis, more accurate approximation results may be achieved by the normalization, and second the polynomial coefficients will be further compressed in real encoding/decoding processing. Normalization of $BM_{i,l}$ and $BN_{i,l}$ will usually reduce the dynamic range of $Coef_i(l)$, so that its following quantization will be more precise. In other words, $BN_{i,l}(u,v)$ represents a single pixel at the position u,v and is a floating point value (namely the N-bit integer value of the pixel, normalized to [0,1]). $BM_{i,l}(u,v)$ is also a floating point value (namely the M-bit integer value at the same position, also normalized to [0,1]). Advantageously, the present invention describes how to predict $BN_{i,l}(u,v)$ from $BM_{i,l}(u,v)$.

The coefficients $Coef_i(l)$ refer to the block level. That means for each block there is only one set of coefficients, so that all the pixels within a block share the same coefficients.

One aspect of the present invention is to code the metadata (at least the coefficients) in a way that uses the same idea of inter-coding: only the residual between temporally consecutive blocks are quantized and entropy coded. In real encoding/decoding processing, the overhead of the metadata (meaning here the polynomial coefficients) is considerable. In the case that Eq. (4) is employed, the data size of the metadata of each synchronized frame pair $IM_i$, $IN_i$ is 4×⌊W/bSize⌋×⌊H/bSize⌋ floating-point values. In addition, quantization of these values should be of very high precision. Thus, a compression scheme for the metadata is advantageous to improve the overall coding efficiency.

Since there is high correlation between the consecutive frames of a sequence, there also exists high correlation between the metadata of consecutive frames. Hence, encoding the difference between consecutive $Coef_i$ instead of encoding the $Coef_i$ directly will significantly improve the coding efficiency. A general method for encoding/decoding the metadata is shown in FIG. 4.

Figure 4:
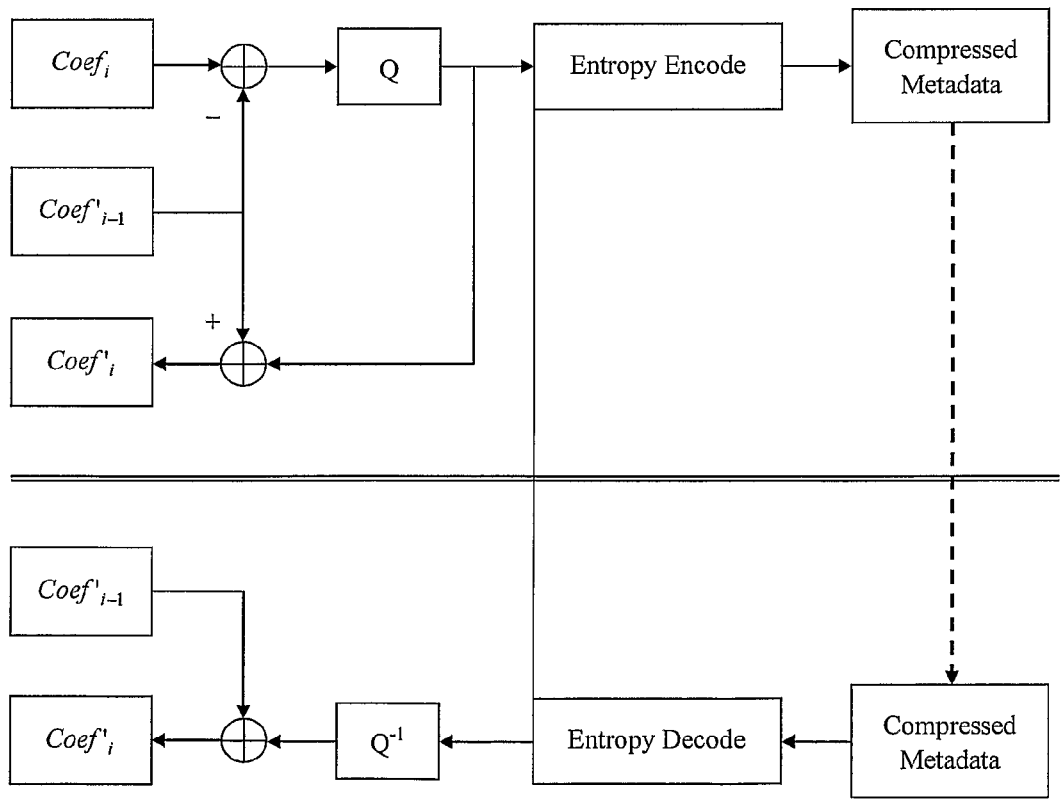
FIG. 4 a block diagram of metadata encoding and decoding.

The upper part of FIG. 4 shows the encoding process for the coefficients $Coef_i$. At first, the difference between $Coef_i$ and $Coef'_{i-1}$ (the reconstructed $Coef_{i-1}$), which is usually called residual in the field of video coding, is quantized. Then the quantized residual is entropy coded. The set of coefficients of the first frame pair is independently quantized and entropy encoded.

At the decoder, an inverse processing is done: first, the compressed metadata is entropy decoded and then de-quantized to generate the residual of $Coef_i$; second, the residual of $Coef_i$ is added to the already decoded $Coef\square_{i-1}$ to obtain $Coef\square_i$. The set of coefficients of the first frame pair is independently de-quantized and entropy decoded. Though in this example the coefficients are formatted and transmitted as metadata, this is only an exemplary possibility.

Other methods that utilize the correlation among the metadata may also be employed for the metadata compression.

One aspect of the invention is a method for predicting a high bit depth video sequence from a low bit depth video sequence that is of the same visual content as the high bit depth video sequence, comprising a module for localized approximation of a high bit depth frame by applying a function of polynomial on the low bit depth frame that stands for the same time stamp as the high bit depth frame, where the localized approximation is employed on each color component of the two considered video sequences, and a module for encoding/decoding the metadata to improve the overall coding efficiency, where the metadata encoding/decoding should be employed for the metadata of each color component.

In one embodiment, the localized approximation module results in a predicted version of the high bit depth video sequence for inter-layer prediction of color bit depth scalable coding and the polynomial coefficients are transmitted as metadata.

In one embodiment, the method for localized polynomial approximation for each color component comprises
dividing the two considered frames into a number of fixed-size blocks, selecting the form of the approximation polynomial, which is in general containing integer power terms, fractional power terms and constant term, normalizing the values of the two considered frames to the range [0,1] to achieve more accurate estimation results of the polynomial coefficients in the following two steps and to achieve more efficient quantization in the metadata compression module, establishing a system of linear equations for each corresponding block pair (which means that the two co-located blocks are selected from the high bit depth frame and low bit depth frame respectively), where each equation represents the relationship between a pixel within the high bit depth block and the corresponding pixel within the low bit depth block that the value of the pixel within the high bit depth block is equal to the polynomial function of the value of the corresponding pixel within the low bit depth block, and solving the established system of linear equations by a least square fit.

The invention claimed is:

1. A method for decoding a first color layer of a video image, wherein the first color layer comprises pixels of a given color and each of the pixels has a color value of a first depth, comprising the steps of
   decoding a second color layer of the video image, wherein the second color layer comprises pixels of said given color and each of the pixels has a color value of a second depth being less than the first depth;
   decoding coefficients of a linear transform function;
   decoding a residual block or image;
   applying the transform function having said decoded coefficients to the decoded second color layer of the video image, wherein a predicted first color layer of the video image is obtained; and
   updating the predicted first color layer of the video image with the residual block or image.

2. Method according to the claim 1, wherein the step of decoding a residual block or image comprises inter-frame decoding.

3. A device for decoding a first color layer of a video image, wherein the first color layer comprises pixels of a given color and each of the pixels has a color value of a first depth, comprising
   means for decoding a second color layer of the video image, wherein the second color layer comprises pixels of said given color and each of the pixels has a color value of a second depth being less than the first depth;
   means for decoding coefficients of a linear transform function;
   means for decoding a residual block or image;
   means for applying the transform function having said decoded coefficients to the decoded second color layer of the video image, wherein a predicted first color layer of the video image is obtained; and
   means for updating the predicted first color layer of the video image with the residual block or image.

* * * * *